United States Patent
Forlenza et al.

(10) Patent No.: US 11,163,421 B2
(45) Date of Patent: Nov. 2, 2021

(54) QUEUING FILES TO BE SENT TO AN APPLICATION

(71) Applicant: International Business Machines Corporation, Armonk, NY (US)

(72) Inventors: Randolph M. Forlenza, Austin, TX (US); John P. Kaemmerer, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 15/951,507

(22) Filed: Apr. 12, 2018

(65) Prior Publication Data

US 2018/0232118 A1    Aug. 16, 2018

Related U.S. Application Data

(63) Continuation of application No. 14/023,588, filed on Sep. 11, 2013, now Pat. No. 10,013,142, which is a continuation of application No. 11/034,549, filed on Jan. 13, 2005, now abandoned.

(51) Int. Cl.
  *G06F 16/00* (2019.01)
  *G06F 3/0482* (2013.01)
  *G06F 9/451* (2018.01)

(52) U.S. Cl.
  CPC ........... *G06F 3/0482* (2013.01); *G06F 9/451* (2018.02)

(58) Field of Classification Search
  CPC ...................................................... G06F 16/30

USPC ........................................................ 707/609
See application file for complete search history.

(56) References Cited

U.S. PATENT DOCUMENTS

| | | |
|---|---|---|
| 5,577,041 A | 11/1996 | Sharma et al. |
| 2003/0046349 A1 | 3/2003 | Burgin et al. |
| 2006/0026236 A1 | 2/2006 | Scian et al. |
| 2006/0044984 A1 | 3/2006 | Sato et al. |
| 2006/0168312 A1 | 7/2006 | Young et al. |
| 2006/0185454 A1 | 8/2006 | Kung et al. |
| 2014/0013277 A1 | 1/2014 | Forlenza et al. |
| 2018/0232118 A1 | 8/2018 | Forlenza |

OTHER PUBLICATIONS

Sharick, Paula, CuteFTP, May 14, 1999, ITProToday, p. 1-2 (Year: 1999).*

(Continued)

*Primary Examiner* — Anhtai V Tran
(74) *Attorney, Agent, or Firm* — Schmeiser, Olsen & Watts, LLP; Stephanie Carusillo

(57) ABSTRACT

A first file is selected from within a file directory. When a first function is activated while the first file is selected, the first file is associated with a first queue, wherein the first function is selected for activation from a list of available functions that may be selectively applied to selected files within the file directory. In response to an action of a user, a second file is subsequently selected from within the file directory. When a second function is activated while the second file is selected and the first file is within the first queue, the second file and the first file are automatically sent to an application, wherein the application concurrently imports and opens both the first file placed within the first queue and the second file subsequently selected for use by a data processing system.

20 Claims, 9 Drawing Sheets

(56) References Cited

OTHER PUBLICATIONS

By Ed Bott and Woody Leonhard, Office File Management for Experts, Oct. 31, 2003, Inform IT, Pearson, pp. 1-2 (Year: 2003).*
CuteFTP (Home) versions 3.0 through 5.0.4. Release Notes, CuteFTP 5.0.4 XP (Aug. 2003), GlobalSCAPE Knowledgebase, pp. 1-25 (Year: 2003).*
CuteFTP Release Notes "(hereinafter CuteFTP) in view of Bott et al." Special Edition Using Microsoft Office 2003 (Year: 2003).*
Notice of Allowance (dated Jul. 1, 2013) for U.S. Appl. No. 11/034,549, filed Jan. 13, 2005, First Named Inventor Randolph M. Forlenza, Confirmation No. 7209.
Amendment (dated Apr. 3, 2013) for U.S. Appl. No. 11/034,549, filed Jan. 13, 2005, First Named Inventor Randolph M. Forlenza, Confirmation No. 7209.
Reply Brief (Jul. 27, 2009) for U.S. Appl. No. 11/034,549, filed Jan. 13, 2005, First Named Inventor Randolph M. Forlenza, Confirmation No. 7209.
Appeal Brief (Feb. 24, 2009) for U.S. Appl. No. 11/034,549, filed Jan. 13, 2005, First Named Inventor Randolph M. Forlenza, Confirmation No. 7209.
Appeal Brief (Oct. 8, 2008) for U.S. Appl. No. 11/034,549, filed Jan. 13, 2005, First Named Inventor Randolph M. Forlenza, Confirmation No. 7209.
Notice of Appeal (Feb. 14, 2008) for U.S. Appl. No. 11/034,549, filed Jan. 13, 2005, First Named Inventor Randolph M. Forlenza, Confirmation No. 7209.
Final Office Action (dated Nov. 14, 2007) for U.S. Appl. No. 11/034,549, filed Jan. 13, 2005, First Named Inventor Randolph M. Forlenza, Confirmation No. 7209.
Supplemental Response (dated Aug. 23, 2007) for U.S. Appl. No. 11/034,549, filed Jan. 13, 2005, First Named Inventor Randolph M. Forlenza, Confirmation No. 7209.
Amendment (dated Jul. 13, 2007) for U.S. Appl. No. 11/034,549, filed Jan. 13, 2005, First Named Inventor Randolph M. Forlenza, Confirmation No. 7209.
Office Action (dated Apr. 13, 2007) for U.S. Appl. No. 11/034,549, filed Jan. 13, 2005, First Named Inventor Randolph M. Forlenza, Confirmation No. 7209.
Office Action (dated Mar. 3, 2015) for U.S. Appl. No. 14/023,588, filed Sep. 11, 2013.
Amendment (dated Jun. 3, 2015) for U.S. Appl. No. 14/023,588, filed Sep. 11, 2013.
Office Action (dated Nov. 13, 2015) for U.S. Appl. No. 14/023,588, filed Sep. 11, 2013.
Amendment (dated Jan. 25, 2016) for U.S. Appl. No. 14/023,588, filed Sep. 11, 2013.
Final Office Action (dated Sep. 22, 2016) for U.S. Appl. No. 14/023,588, filed Sep. 11, 2013.
"Whooze", Help2go.com Moderator, "Attachments opening in MS publisher—how do I stop" Jul. 16, 2004, http://www.help2go.com/forum/computer-help/82203-jpeg-attachments-opening-ms-publisher-how-do-i-stop.html.
Final Amendment (dated Nov. 22, 2016) for U.S. Appl. No. 14/023,588, filed Sep. 11, 2013.
Office Action (dated Feb. 8, 2017) for U.S. Appl. No. 14/023,588, filed Sep. 11, 2013.
Amendment (dated May 8, 2017) for U.S. Appl. No. 14/023,588, filed Sep. 11, 2013.
Final Office Action (dated Aug. 25, 2017) for U.S. Appl. No. 14/023,588, filed Sep. 11, 2013.
Final Amendment (dated Oct. 20, 2017) for U.S. Appl. No. 14/023,588, filed Sep. 11, 2013.
Advisory Action (dated Dec. 1, 2017) for U.S. Appl. No. 14/023,588, filed Sep. 11, 2013.
Supplemental Amendment (dated Dec. 14, 2017) for U.S. Appl. No. 14/023,588, filed Sep. 11, 2013.
Advisory Action (dated Jan. 12, 2018) for U.S. Appl. No. 14/023,588, filed Sep. 11, 2013.
Notice of Allowance (dated Mar. 1, 2018) for U.S. Appl. No. 14/023,588, filed Sep. 11, 2013.

* cited by examiner

QUEUING FILES TO BE SENT TO AN APPLICATION

This application is a continuation application claiming priority to Ser. No. 14/023,588, filed Sep. 11, 2013, now U.S. Pat. No. 10,013,142, issued Jul. 3, 2018, which is a continuation of Ser. No. 11/034,549, filed Jan. 13, 2005.

BACKGROUND OF THE INVENTION

1. Technical Field

The present invention relates generally to computer systems, and in particular to processing files of a computer system. Still more particularly, the present invention relates to a method and system for selecting files to be sent to an application on a computer system.

2. Description of the Related Art

The ability to open files from within file directories is a function provided within most conventional operating systems (OS). Microsoft Windows® operating systems (OS) (a trademark of Microsoft Corporation), for example, provides a function called "Send To" within the list of user-selectable functions available when one or more files is selected (highlighted) within a file directory. As is known in the art, files that are selected are displayed with highlighted font compared to other files that are not selected. The "Send To" function/option permits the user to import one or more pre-selected files from the file directory to an application. With Windows OS, this function requires the user to first select the file and then select an application to import the file into. Those skilled in the art are familiar with the functionality and utilization of the "Send To" function.

FIGS. 2A and 2B provide two Windows graphical user interfaces (GUIs) illustrating the selection of "Send To" function for a pre-selected file within the file directory. As shown, directory GUI 200 includes a file area 206 within which a file 210 ("example") is pre-selected by a user of directory GUI 200 (e.g., by an action such as right clicking on the mouse with the cursor over the file). Directory GUI 200 also includes task list 202 and directory list 204, which may also contain files that are individually selectable when the user opens the particular directory.

As indicated by FIG. 2A, Lotus Word application has been selected for importing the "Example" file 210. Once the user completes his/her selection of Example file 210, the user then right clicks on the graphical pointing device (e.g., mouse or some other selection mechanism), to open up an options window 212 with a list of functions that may be performed on/with the Example file 210. Within the FIG. 2A illustration, the "Send To" function has been selected by the user to apply to the previously selected file 210. This selection triggers the opening of an application list 214 which includes each of the available applications to which the Example file 210 may be sent.

FIG. 2B illustrates what occurs once this application is selected for Example file 210 to be sent to. The OS activates/opens the Lotus Word application (if that application was not already opened on the computer system). Then, Example file 210 is imported into Lotus Word and opened in the application GUI 220. Application GUI 220 shows Example file 210 opened in Lotus Word application on the computer system and the file contents displayed within content area 222 of Lotus Word's application GUI 220.

Several limitations exist with the above-described conventional implementation of the "Send To" function. First, with the conventional implementation, the "Send To" function only applies to files selected from a currently-opened single directory folder. That is, there is currently no way for a user to select a first file from a first folder and then open another folder and select a second file without losing the selection of the first file, although both files are to be sent to the same application. Conventional application requires the user to make two separate accesses to the file directory, open the specific folder, select the file within the folder and send it to the application. These steps are then required to be repeated for the next file.

Second, with the conventional implementation, grouping more than one file to send to an application with a single "Send To" operation requires the user to hold down either the Control key (to select individual files, including non-sequential ones) or the Shift key (to select a series of consecutive files) and then right click on one of the highlighted files before choosing "Send To" from the options window. The user thus has to remember the correct combination of key strokes and mouse interactions to enable this selection of a set of files for importing.

Third, with conventional implementation, there is no way for a user to open/import all files in a single subdirectory/folder by right clicking on the particular subdirectory. With some conventional methods, a right click on a subdirectory followed by selection of an application from the "Send To" function has the effect of opening the application without importing the files. Users are currently unable to select and open all the files in a directory and folders and subdirectories within the directory by using the "Send To" function. For example, when a computer system has directories of code that have to be viewed or edited in an application, the current "Send To" does not provide a quick or convenient import mechanism for the multiple directories.

The present invention thus recognizes that it would be desirable to provide a more efficient method for handling importing files from a file directory. The invention further recognizes that providing an enhanced OS that does not include the above limitations would be a welcomed improvement. These and other benefits are provided by the invention described herein.

SUMMARY OF THE INVENTION

Disclosed are a method and a computer program product that enable files in a file directory to be queued prior to "sending" the files to a common application. A background operating system (OS) is enhanced by including a set of queue functions/options for selection when a file is selected within a file directory. Among these additional functions/options are "Queue It", "Queue Edit", and "Queue Send To." These queue functions each represent an action item that may be selected to carry out a specific function (or operation) on/with one or more pre-selected (i.e., marked or queued) files.

Depending on the implementation, the "Queue It" function allows the user to either (1) mark one or more files as previously selected or (2) add the one or more file(s) to a queue created in memory. With the former implementation, marked files retain their highlighted view without the user having to depress the CTRL or shift keys when selecting another file. Also, the user may later return to a marked file and un-select that marked file by clicking on the file and selecting an un-queue/delete from queue command. This command only un-selects the file from the list of files marked for later importing to an application via the "Queue Send to" option.

In the latter implementation, the file name and address link are added to the queue (rather than the actual file), in one embodiment. When there is at least one file in the queue, the "Queue Edit" function allows the user to view, sort, and delete files in the queue. Finally, the "Queue Send To" function triggers the import of the queued and/or selected files into the selected application. All three functions are provided when the user right clicks on a file or folder within the file directory. However, in one embodiment, the "Queue Edit" function may only appear as an option when there is at least one file in the queue. In another embodiment, all three queue functions are always displayed in the list of options but the "Queue Edit" function is ghosted (i.e., not available for selection) when there are no files queued.

When there is at least one file in the queue, "Queue Edit" is provided as a selectable option, and if selected, a window is displayed with a list of the file(s) in the queue, and the user is allowed to scroll through and manipulate the list (e.g., delete individual file(s) from the queue and/or sort the list of files). Sorting the list of files may be completed via a separate sort window, which enables user selection of one of multiple provided types of sorting. Once the user is finished editing or sorting the list and exits the Queue Edit window, the user's changes are retained/stored within the queue.

The user pre-selects a file, group of files, or folder/directory of files and then the user has the option of queuing the files in a single queue that is to be sent to an application. The user queues the file(s) by selecting the "Queue It" function. This function places the name and address link of the file(s) in a temporary storage area or in computer system memory. The user then has the option of opening another folder and selecting additional files to add to the queue. When additional files are added to the queue and the user is ready to send the associated files to an application, the user selects the "Queue Send To" function.

Selection of the "Queue Send To" function opens a list of available applications to which the selected and queued (or marked) files may be sent. Once an application is selected, all of the selected files and files within the created file queue are opened in the application GUI of the selected application, and the user is able to manipulate the files and/or the content of the files. "Queue Send To" operates similarly to "Send To" when no files have been queued or marked, i.e., only the currently selected files are sent to the application. However, both selected files and queued (or marked) files are sent to the application when there are files in the queue (or marked files) prior to selecting the "Queue Send To" function.

In one implementation, multiple queues may be created and the user is required to choose among the available queues to store the selected file(s)' name(s) and address link(s). The queues may be provided unique names or identifiers (IDs), and the user may select specific files to be stored within the specific queue. Thus, a first file may be stored in a first file queue and then another file may be stored in a second file queue before the first file queue is sent to an application. In this embodiment also, a second queue may be temporarily maintained in the file directory even when a user selects Queue Send To for another queue. When the user later accesses the file directory again, the second queue is still available for storage of additional files or for sending to another application.

The above as well as additional objectives, functions, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

Figure 1:
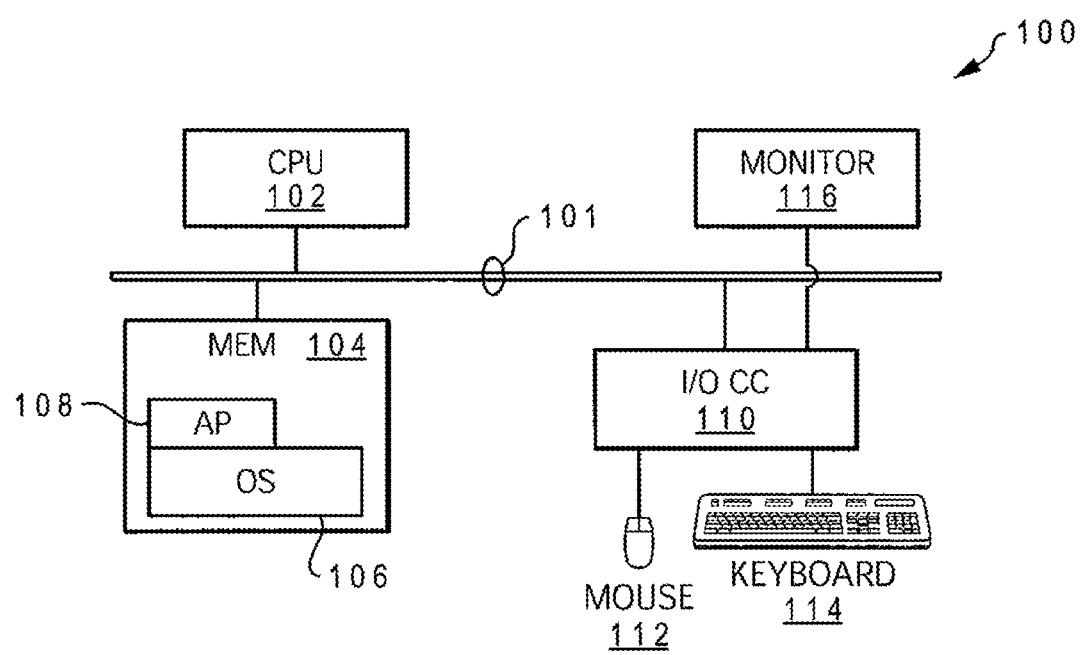
FIG. 1 is a block diagram illustrating the main components of a computer within which the various embodiments of the present invention may advantageously be implemented.
Figure 2A:
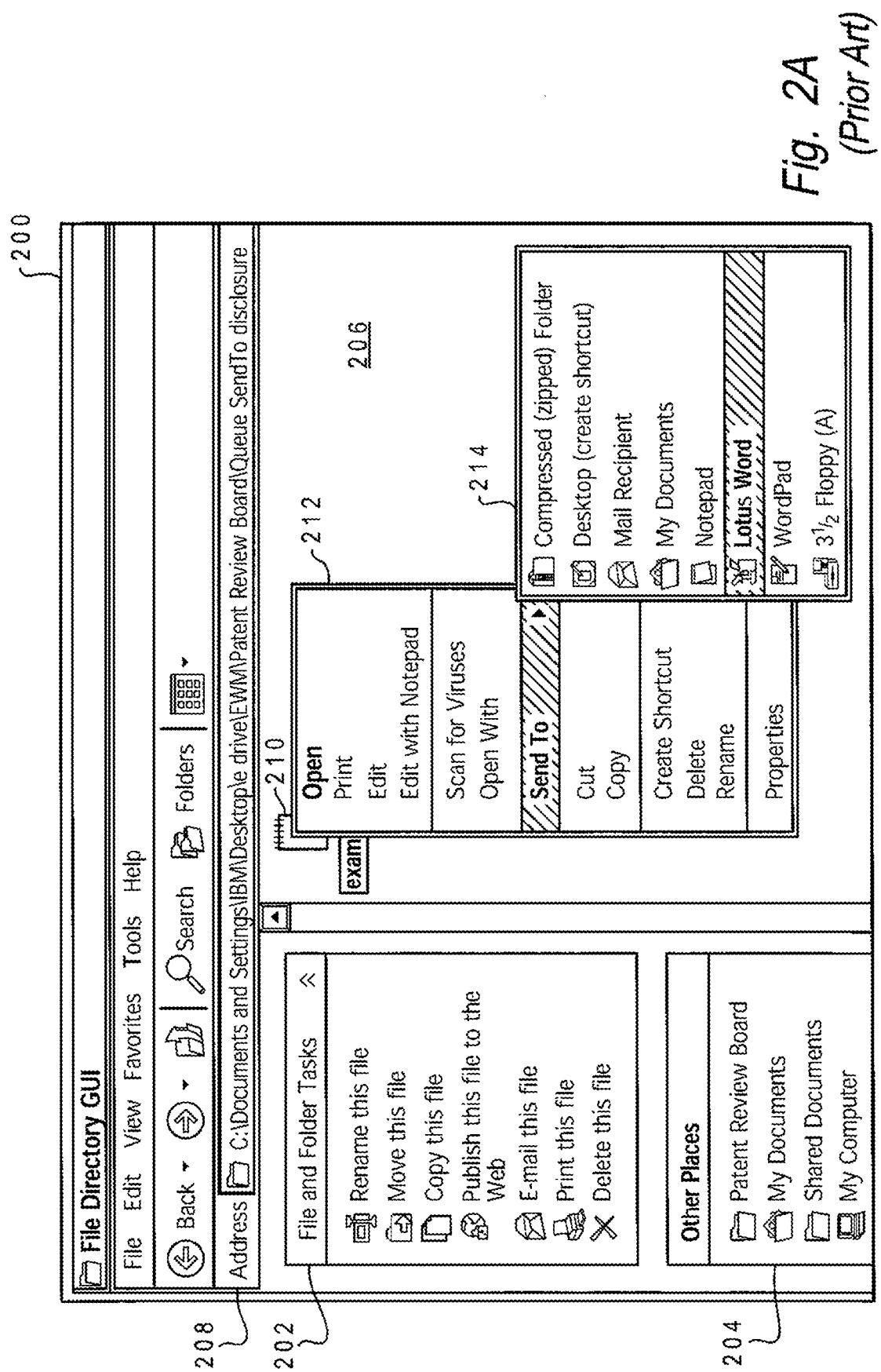
FIG. 2A is a graphical user interface (GUI) illustrating the Send To function within a file directory in accordance with the prior art.
Figure 2B:
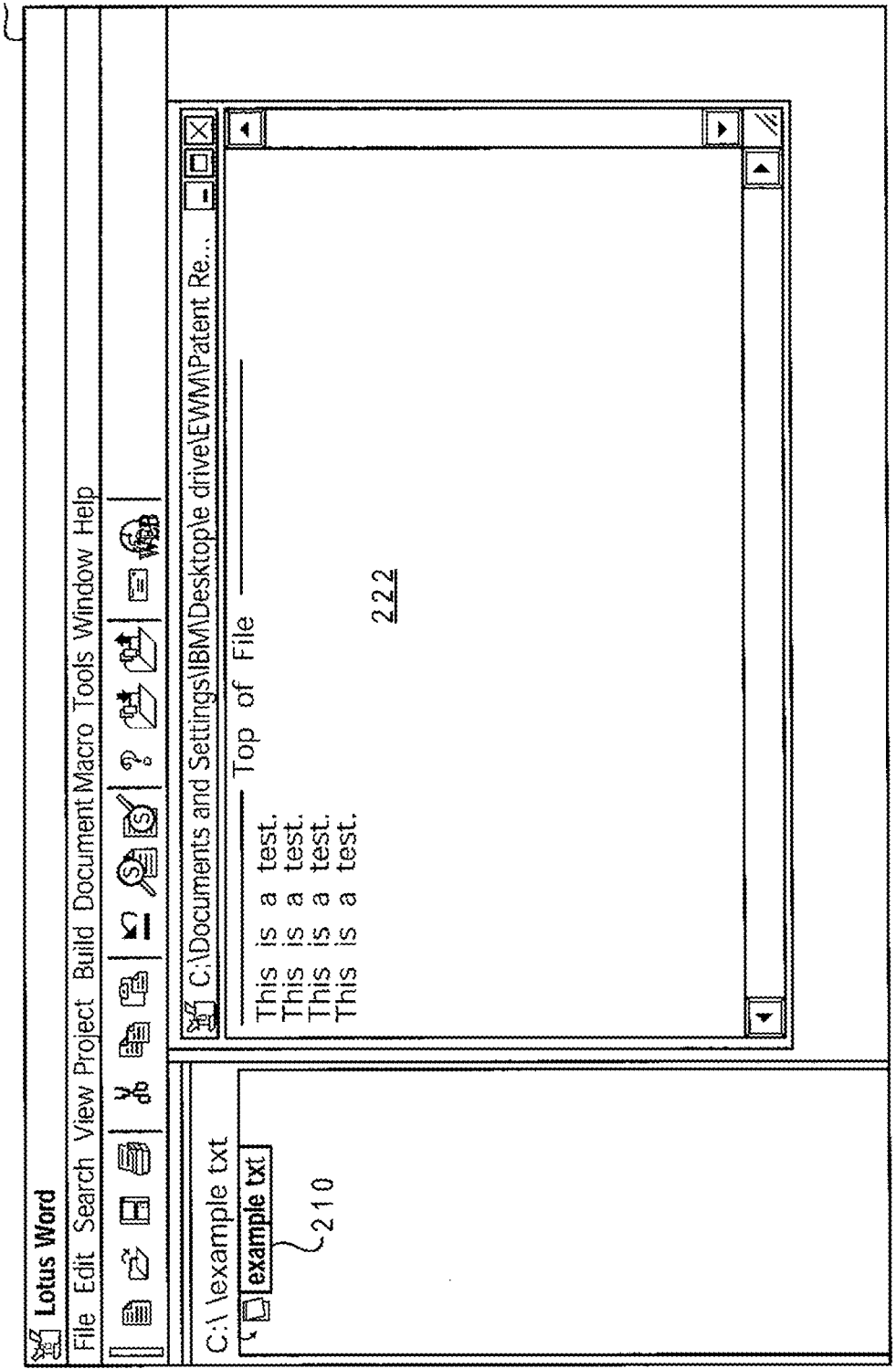
FIG. 2B is an application GUI opened following the Send To selection in a file directory of FIG. 2A.

DETAILED DESCRIPTION OF AN
ILLUSTRATIVE EMBODIMENT

The present invention provides a method and a computer program product that enable files in a file directory to be queued prior to "sending" the files to a common application. A background operating system (OS) is enhanced by including a set of queue functions/options for selection when a file is selected within a file directory. Among these additional functions/options are "Queue It", "Queue Edit", and "Queue Send To." These queue functions each represent an action item that may be selected to carry out a specific function (or operation) on/with one or more pre-selected (i.e., marked or queued) files.

When there is at least one file in the queue, the "Queue Edit" function allows the user to view, sort, and delete files in the queue. Finally, the "Queue Send To" function triggers the import of the queued and/or selected files into the selected application. All three functions are provided when the user right clicks on a file or folder within the file directory. However, in one embodiment, the "Queue Edit" function may only appear as an option when there is at least one file in the queue. In another embodiment, all three queue functions are always displayed in the list of options but the "Queue Edit" function is ghosted (i.e., not available for selection) when there are no files queued.

Depending on the implementation, the "Queue It" function generally allows the user to either (1) mark one or more files as previously selected or (2) add the one or more file(s) to a queue created in memory. With the former implementation, marked files retain their highlighted view without the user having to depress the CTRL or shift keys when selecting another file. The highlight may be a different shade or color from the normal highlighted view of a selected file. Also, the user may later return to a marked file and un-select that marked file by clicking on the file and selecting a "remove from queue" command. This command only un-selects the file from the list of files previously marked for later importing to an application via the "Queue Send to" function.

In the latter implementation, the concept of queuing refers to placing the file or parameters associated with the file in a temporary memory construct referred to as a queue. The particular parameters utilized may be one (or a combination) of the file name, some other unique file identification (ID), and an address/location/link for the file. Thus, the file name and/or ID and/or address/location/link are added to the queue (rather than the actual file), in one embodiment. The address/location/link may be tied to the name and/or ID and not actually displayed during the "Queue Edit" function described below.

The invention contemplates that, for certain embodiments, the actual file may be placed in the queue to enable more direct and faster opening of the file in the application, copying the file provides a redundant solution and may lead to a bog down of memory when multiple files or folders or files are queued at one time. For ease of description of the invention, references to placing the file in the queue, etc. are understood to refer to either embodiment without limitations imposed thereon. Further, the implementation in which the files are marked is discussed only where necessary to distinguish that feature/operation from one specifically related to the queuing of the file parameters.

With reference now to the figures, and in particular to FIG. 1, there is illustrated an exemplary computer system within which the functions of the invention may advantageously be implemented. Computer system 100 includes a central processing unit (CPU) 102 connected to memory 104 and Input/Output Channel Controller (I/OCC) 110 via a system bus 101. Connected to I/OCC 110 are several input and output devices of which mouse 112, keyboard, 114 and monitor 116 are illustrated.

Illustrated within memory 104 are operating system (OS) 106 and application program 108. Operating system 106 provides most of the functionality required for opening a file directory GUI, which is displayed on monitor 116 and accessible to a user of the computer system 100 by mouse 112 and keyboard 114. Other means of interacting with file directory GUI may be provided in alternative implementations. Further, while computer system 100 is illustrated with specific hardware and software components, the invention is applicable to any type of computer system configuration so long as the background OS includes the enhanced file queuing options described herein. No structural or functional limitations are implied by the specific configuration and description thereof within the present specification.

For purposes of illustration, OS 106 is a Windows based operating system, such as Windows XP®, which is a trademark of Microsoft Corp. The functions of the invention are, however, applicable to any operating system that supports the enhanced queuing/marking functionality beyond the conventional selection of files and associated use of the Send To function. Thus, for example, the invention may also be implemented within a Linux-based operating system.

Figure 3:
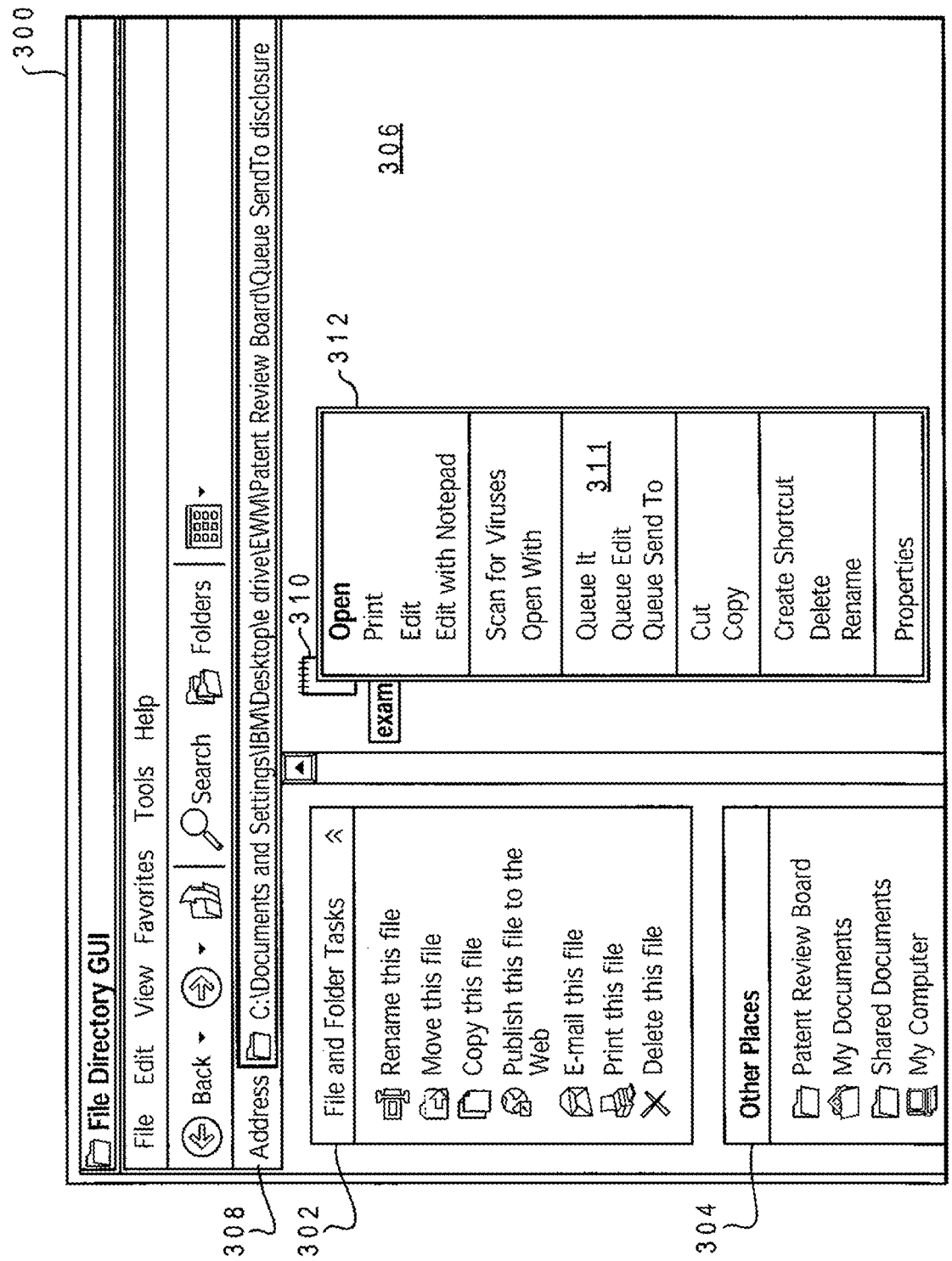
FIG. 3 is a file directory GUI with a list of available functions/options for a selected file that includes the queue functions, according to one embodiment of the invention.

Turning now to FIG. 3, there is illustrated an exemplary file directory GUI enhanced with queue functions. File directory GUI 300 displays a task list 302 of file specific functions and a directory list 304 of available directories on the user's computer system. Each directory within directory list 304 may include one or more files (or sub-directories or folders of files) that may be selected by a user for queuing/marking and/or sending to an application. File directory GUI 300 also includes an address bar 308 that shows the path of the current directory opened for user selection of files therein.

Finally, file directory GUI 300 includes file space 306 that displays the available files within a current open directory. As shown, file space 306 includes "Example" file 310. When the user right clicks on Example file 310, an options list 312 opens within file space 306. As shown, in addition to the standard available options, options list 312 includes three queue functions/options, namely, Queue It, Queue Edit, and Queue Send To. The specific functionality associated with each of the queue functions is now described.

The "Queue It" function allows the user to add one or more file(s) to a queue. (Marking the file is one method of implementing the "Queue It" functionality of the invention and is not a separate option in the described embodiment). When there is at least one file in the queue, the "Queue Edit" function allows the user to view, sort, and delete files in the queue. Finally, the "Queue Send To" function triggers the import of the queued and/or selected files into the selected application. All three functions are provided when the user right clicks on a file or folder within the file directory. However, in one embodiment, the "Queue Edit" function may only appear as an option when there is at least one file in the queue. In another embodiment, all three queue functions are always displayed in the list of options but the "Queue Edit" function is ghosted (i.e., not available for selection) when there are no files queued.

The user pre-selects a file, group of files, and/or folder/directory of files and then the user has the option of queuing the files in a single queue that is to be sent to an application. The user queues the file(s) by selecting the "Queue It" function. This function places the name and address/location/link of the file(s) in the computer memory (or other temporary storage area). When the files are marked (rather than queued), only the locations of the marked files are maintained in memory for reference by the "Send To" program module. With either implementation, the user then has the option of opening another folder and selecting additional files to add to the queue. When additional files are added to the queue and the user is ready to send the associated files to an application, the user selects the "Queue Send To" function.

When there is at least one file in the queue, "Queue Edit" is provided as a selectable option, and if selected, a window is displayed with a list of the file(s) in the queue, and the user is allowed to scroll through and manipulate the list (e.g., delete individual file(s) from the queue and/or sort the list of files). When the delete option is chosen, the file is deleted from the queue. When the sort option is chosen, the available sort options are displayed within a sort window. These sort options may include "move up" and "move down" or "go to top", for example. Once the user is finished editing or sorting the list and exits the Queue Edit window, the user's changes are retained/stored within the queue.

In one embodiment, a separate sort window is opened when the user right clicks on a file within the displayed list from queue edit. Sorting the list of files is then completed via this separate sort window, which enables user selection of one of the multiple types of sorting provided.

In a next embodiment (in which the files are marked), the user places the mouse pointer on a marked file and right clicks to open a drop down list of options, including the sort and delete options. This provides the mechanism by which the user may choose to delete or sort the file.

Selection of the "Queue Send To" function opens a list of available applications to which the selected and queued (or marked) files may be sent. Once an application is selected, all of the selected files and files within the created file queue are opened in the application GUI of the selected application, and the user is able to manipulate the files and/or the content of the files. "Queue Send To" operates similarly to "Send To" when no files have been queued or marked, i.e., only the currently selected files are sent to the application. However, both selected files and queued (or marked) files are sent to the application when there are files in the queue (or marked files) prior to selecting the "Queue Send To" function.

In one implementation, multiple queues may be created and the user is required to choose among the available queues to store the selected file(s)' name(s) and address link(s). The queues may be provided unique names or identifiers (IDs), and the user may select specific files to be stored within the specific queue. Thus, a first file may be stored in a first file queue and then another file may be stored in a second file queue before the first file queue is sent to an application. In this embodiment also, a second queue may be temporarily maintained in the file directory even when a user selects Queue Send To for another queue. When the user later accesses the file directory again, the second queue is still available for storage of additional files or for sending to another application.

Figure 6:
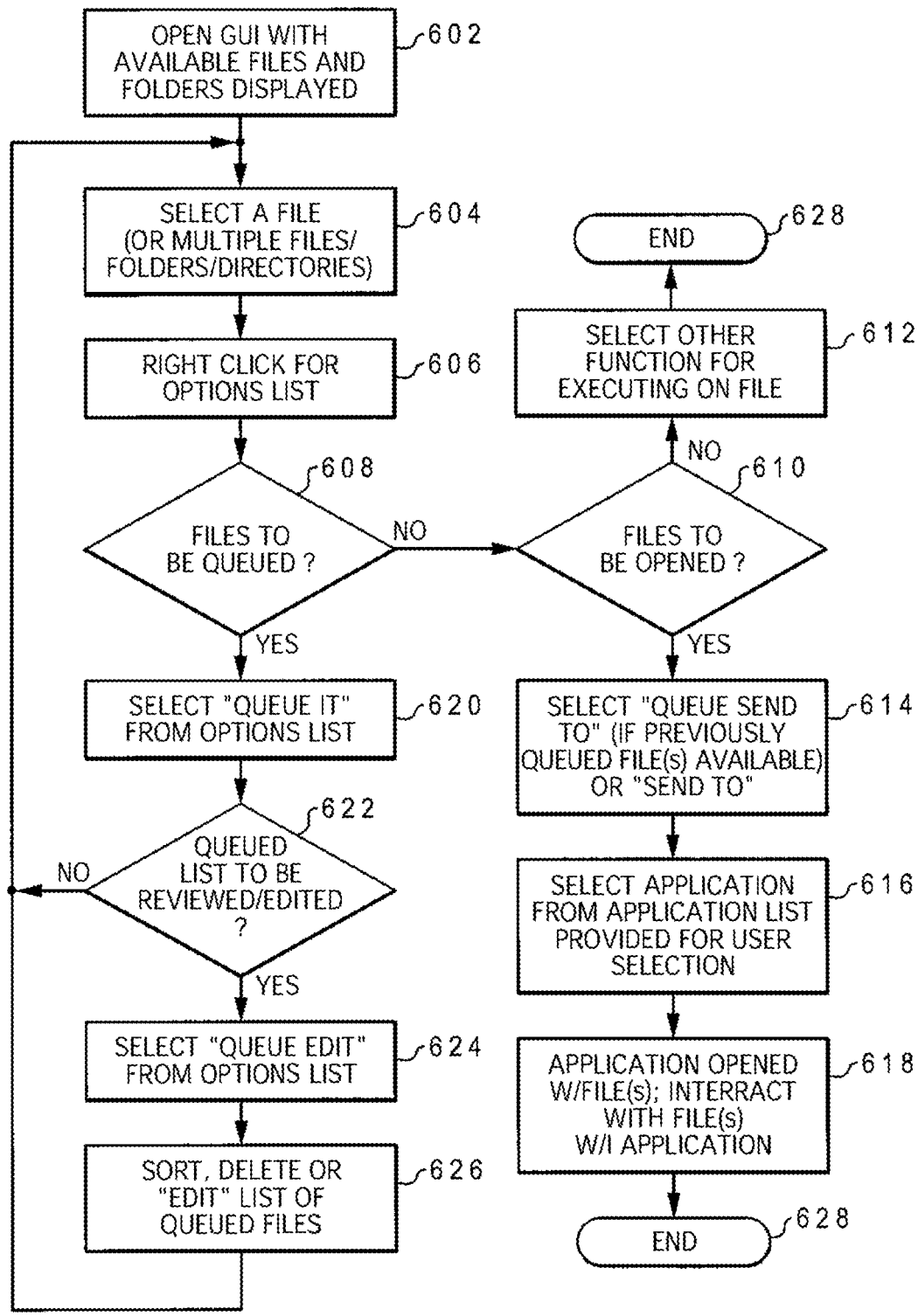
FIG. 6 is a flow chart illustrating the process by which a user utilizes the various queue functions within the file directory GUI, according to one embodiment of the invention.
Figure 7:
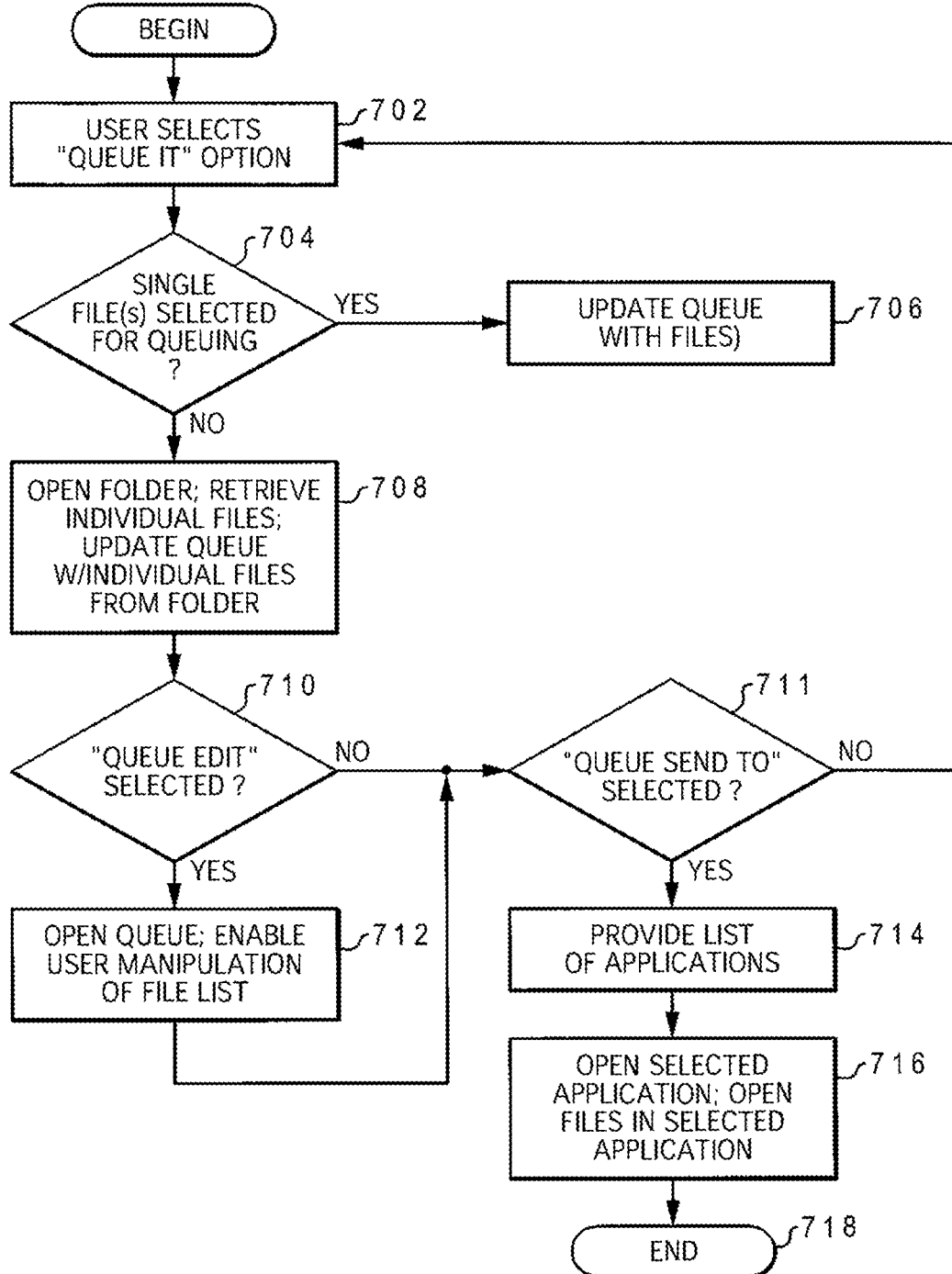
FIG. 7 is a flow chart illustrating the processing by the background operating system when a user selects one of the queue functions within the file directory according to one embodiment of the invention.

Operation of the various queue functions is now described with reference to the flow charts presented as FIGS. 6 and 7. FIG. 6 illustrates the user interaction with the queue functions, while FIG. 7 illustrates the OS processing of the user selections. The process of FIG. 6 begins at block 602, which illustrates the user opening the file directory GUI 300 to display the available files and folders for selection. Then, as shown at block 604, the user selects a file or multiple files, or folders/directories or subdirectories of files. According to one embodiment of the invention, selection of a user of a top-level directory, places all files within that directory, including files in any sub-directories and/or folders associated with the top-level directory, into the queue. This top-down association of files also applies to the implementation in which the files are marked.

Following the file selection, the user right clicks on the mouse (or other selection mechanism with drivers that support similar functions as a mouse right click) to open options list 312, as provided at block 606. The user next determines at block 608 whether the selected file is to be queued (or marked). Assuming the file is not to be queued, a next determination is made at block 610 whether the file is to be opened. If the file is not to be opened or queued (i.e., stored in a queue) or marked, then the user may select another function/option from the options list, as indicated at block 612, and then the process ends at block 628.

Figure 4A:
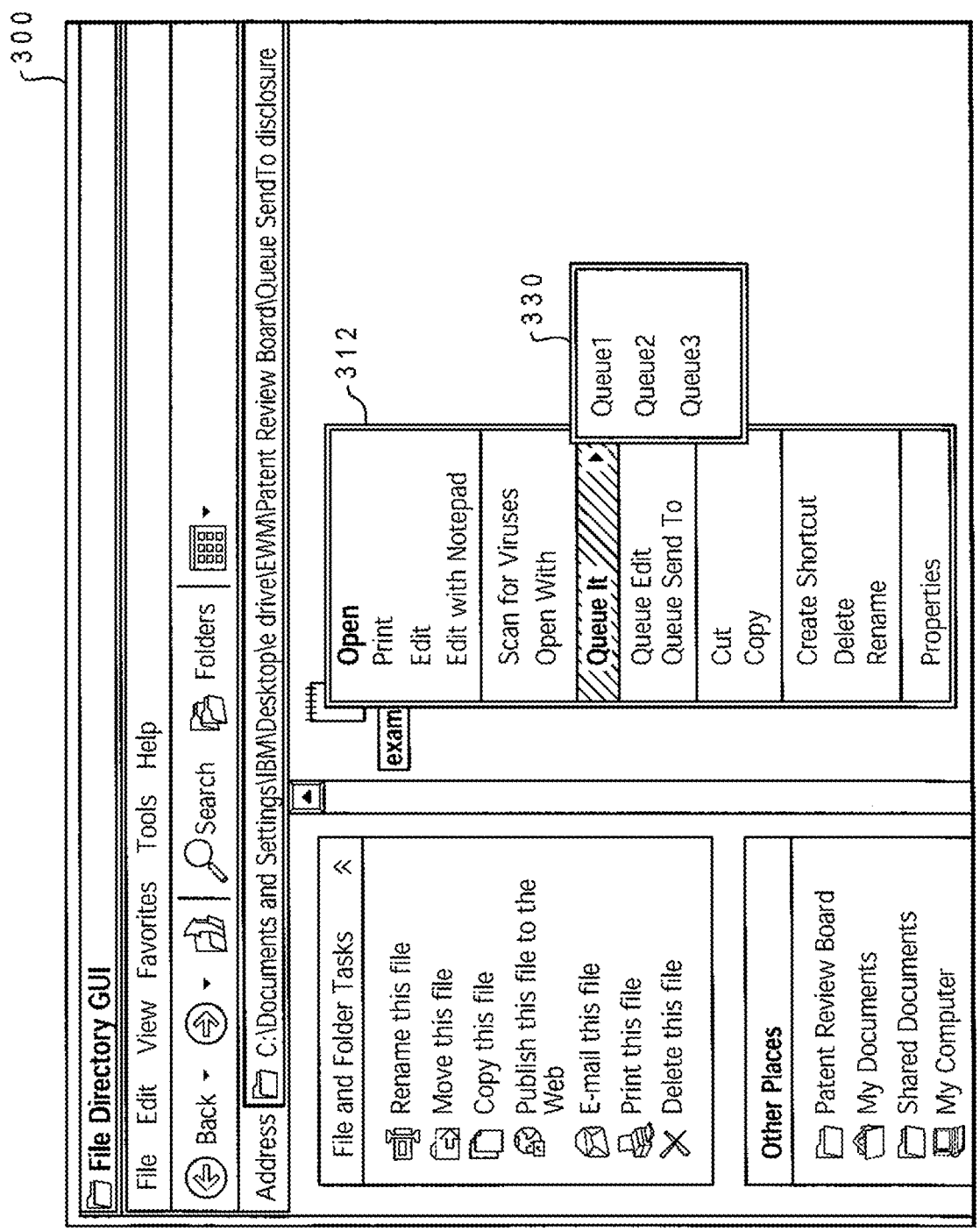
FIG. 4A provides the file directory GUI with the "Queue It" function selected to reveal multiple queues that may individually be selected to queue a file in accordance with one embodiment of the invention.

Returning to block 608, if the file is to be queued (or marked), the user selects the "Queue It" option as shown at block 620. This selection places the selected file (or file parameters) into a queue. A new queue is created if the file is the first one selected to be queued and/or there is no existing queue. Thus, a first selectable function ("Queue It") is provided to place a selected file within a first queue, wherein only selected files are queued, and wherein files from different folders may be queued. In the embodiment in which multiple queues may be created concurrently, selecting the "Queue It" option provides a list of the available queues for storing the selected file (or file parameters). This option requires that the various queues be created at some point during the queuing process. FIG. 4A illustrates file directory GUI 300 with the Queue It option selected to reveal a queue window 330 with multiple queues for user selection.

The user is able to continue placing more files in the queue and may select the files from any folder or the desktop. Also, in one embodiment, the user may select an entire folder of files. That is, the user is able to select a folder (i.e., not just a single file but the directory/folder holding one or more files) at a time. When the user then right clicks on the mouse and chooses "Queue It", each file and/or each file in any subdirectory of the folder is individually placed in the queue.

Following the queuing of the selected file, a determination is made at block 622 whether the user wishes to review or edit the queued list. If the user desires to edit or review the list of queued files, the user selects the "Queue Edit" option from the options list at block 624. As described above, in one embodiment, the "Queue Edit" function is provided only when at least one file has been queued. Thus, when the user right clicks the mouse on a queued file or the desktop, the "Queue Edit" option also shows up along with the "Queue It" function. If there is at least one file in the queue, when the user right clicks on a file, desktop, or folder, the "Queue Edit" function also shows up in the options list. Selecting "Queue Edit" will then display all the files in the queue and enable the user to scroll down to the bottom of the list. In the illustrative embodiment, several user-manipulation buttons are located at the bottom of the list.

As described above, however, rather than provide user-manipulation buttons, an alternative embodiment provides the delete and sort options by the user selecting one of the files within the list and right clicking on the mouse. This opens a window with the delete and sort options available for the selected file.

Figure 4B:
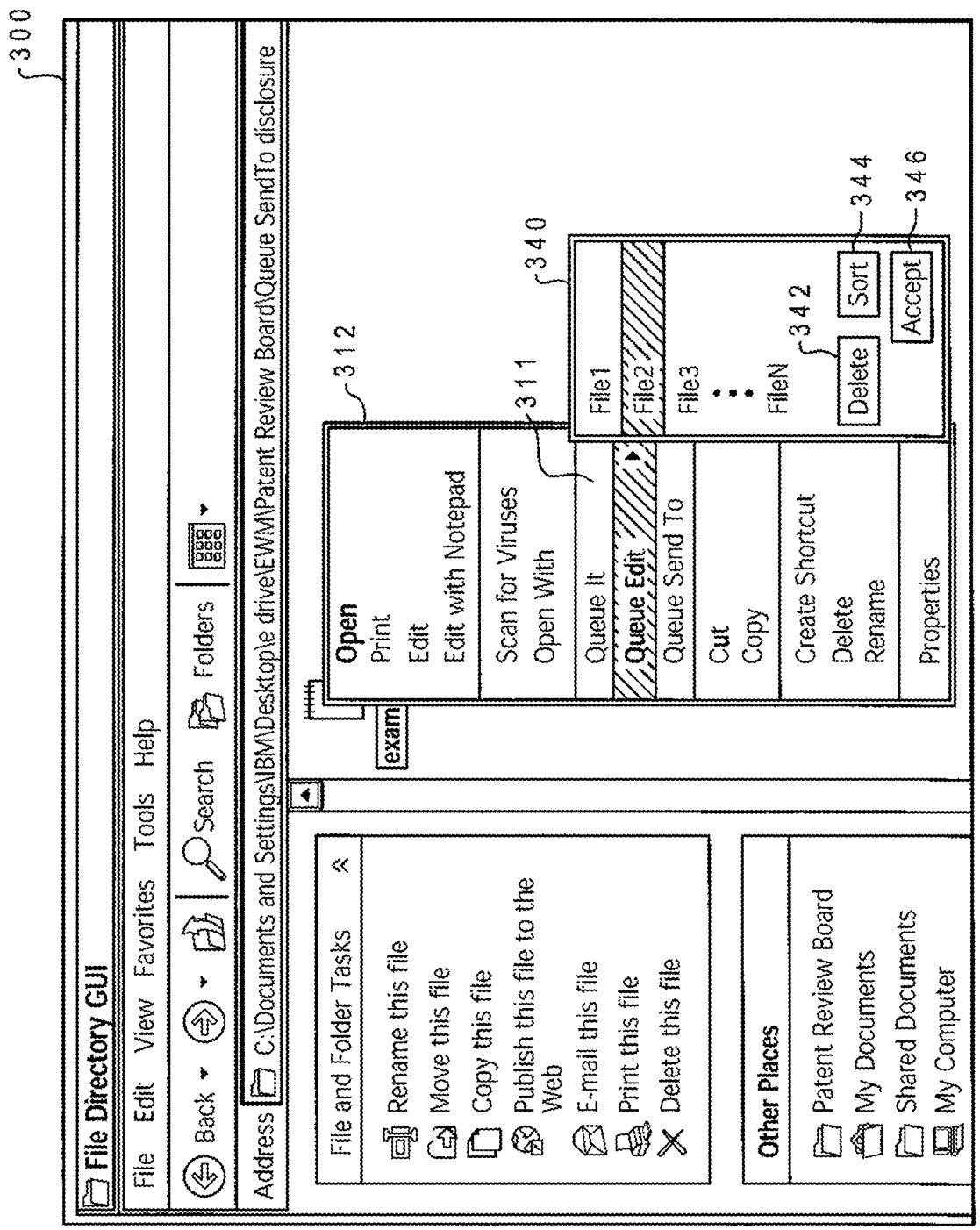
FIG. 4B illustrates the file directory GUI with the Queue Edit function selected to provide a list of the files within the queue for user manipulation, in accordance with one embodiment of the invention.

As illustrated by FIG. 4B, selection of the Queue Edit option opens a drop-down list 440 within which the files have been queue and listed. Also provided within drop-down list 440, are selectable edit options, including delete button 442, sort button or 444, and accept button 446. These buttons enable user manipulation of the list. In one embodiment, when "Sort" button is depressed, a pop-up list of sort types is provided and the user may choose from among the various sorts. Other manipulation of files in a queue may be provided in other embodiments, and the invention is not limited to "Delete" or "Sort." Using these buttons, the user is able to sort, delete, or edit the list of queued files, as shown at block 626.

Turning now to decision block 610, if the selected file is to be opened (i.e., the user wants to send the current file(s) and all of the previously queued filed to an application), the user right clicks on the desktop (within the file space), and selects "Queue Send To", as shown at block 614. An application list is provided, and the user selects an application from the list to import and open the selected and/or marked or queued files, as shown at block 616 which may be performed following a selective queuing of the files. The queued files are then opened within the selected application, and the user is able to interact with the files (or contents of the files) via the application, as shown at block 618. Thus, a second selectable function ("Queue Send To") is provided to automatically open all of the queued and/or selected files with the application, wherein files across different folders can be opened with a single operation of the second function.

When multiple files are pre-selected and/or marked or queued and imported into the same application via the "Queue Send To" function, one file is placed on top of the application GUI. The other files are hidden, minimized, or tiled behind the current window. These other files may be brought to the top of the display area by selecting the Window Menu Item within the main file control options at top of the application GUI, as done with certain OSes or applications. The process then ends at block 628.

Figure 5:
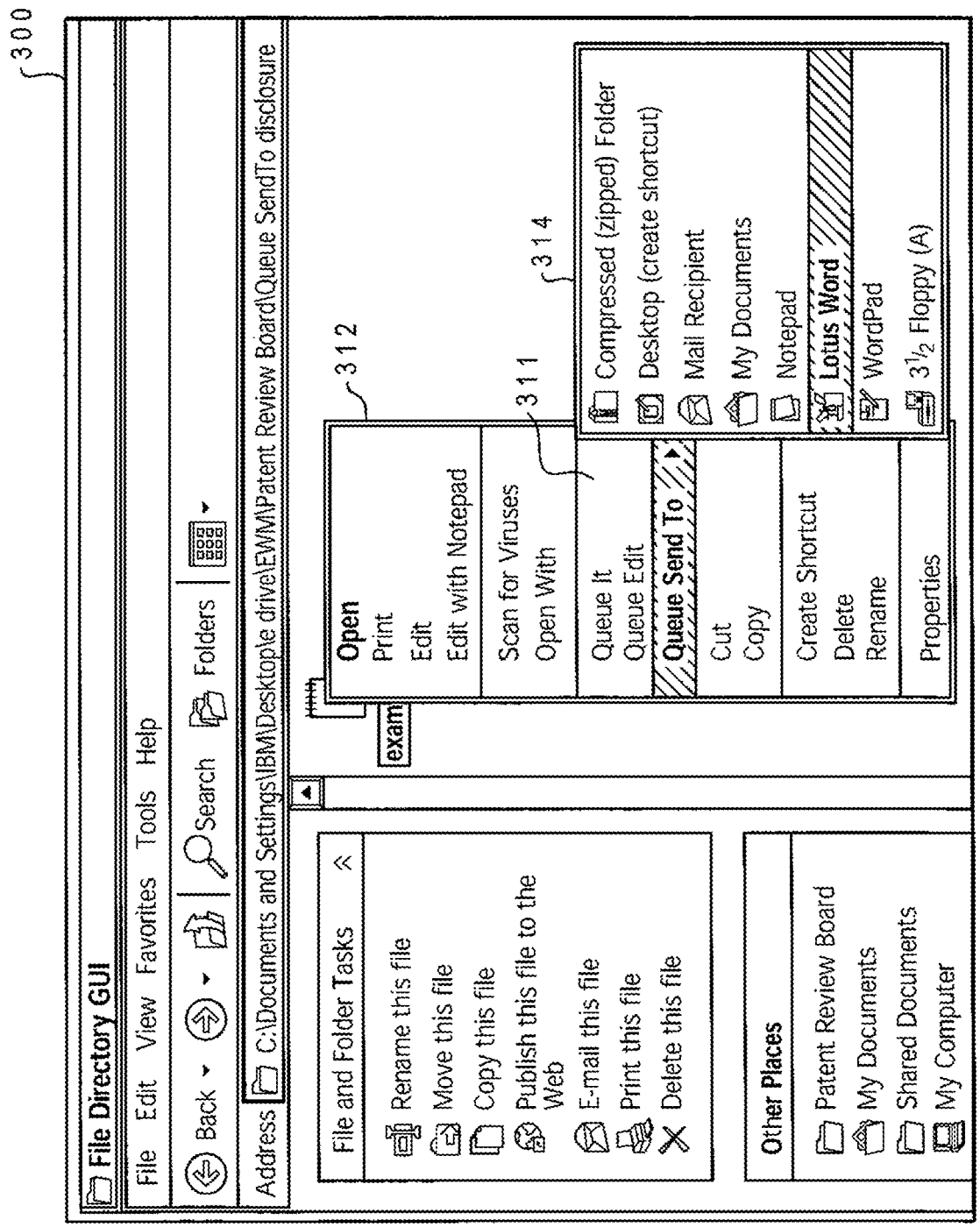
FIG. 5 illustrates the file directory GUI with the Queue Send To option selected to display the list of available applications, according to one embodiment of the invention.

FIG. 5 illustrates the selection of the "Queue Send To" function. As shown, this selection opens up drop down applications list 525, listing available applications for selection. In the illustrative embodiment, the Lotus Word application is selected. As with the conventional Send To option, this selection opens up the Lotus Word application with the display of selected files. However, unlike the conventional implementation, the display of files may comprise files that were queued from more than one directory or folder with the "Queue It" function. The single "Queue Send To" function sends all the files in the queue (and selected or marked) to the selected application. Thus, the function enables files from different folders or directories to be imported into the selected application during a single user access within the file directory GUI.

The OS-side operation illustrated by FIG. 7 begins at block 702 at which the user first selects one or more files (or folders) and then clicks on the "Queue It" option. A determination is made at block 704 whether a single file has been selected for queuing. When only a single file or files within a single directory folder have been selected for queuing, the queue is updated with the selected files as indicated at block 706. However, when the selection is of an entire closed folder (i.e., not just files displayed within the opened folder/directory), the individual files are retrieved from the closed folder and sub-folders therein (via a background process not visible to the user) and sent to the queue, as shown at block 708. A determination is made at block 710, whether the "Queue Edit" function has been selected. If not, a next determination is made at block 711, whether the "Queue Send To" function has been selected. If the "Queue Edit" function is selected, the list of files within the queue is displayed to the user for user manipulation/editing of the list, as provided at block 712.

Returning to block 711, when the "Queue Send To" function is selected, a drop-down applications list is provided to the user at block 714. The user-selected application is then activated, if already opened, or opened, if not already opened, and the files within the queue are imported and opened within the application, as shown at block 716. The process then ends at block 718.

Specific coding is required to enable the operating system to support the above-described functionality provided by the queue functions. The invention contemplates providing this coding as a separate file queuing or marking utility. This file queuing utility may be made available to users of existing operating systems. The file queuing utility may be provided as an update (or patch) to the operating system. Additionally, the file queuing utility may be packaged separately from the operating system and sold or distributed as a separate, licensed, add-on component.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention. For example, while the invention describes user manipulation and interaction by right clicking on a pointing device, certain functions may be provided/implemented via control keys (on a keyboard). Thus, a user may utilized a set of pre-established control keys to select files/subdirectories within a first directory and then open a second directory from which additional files/subdirectories are selected using the control keys. The files and/or subdirectories of both first and second directories selected with the control keys may then be opened with (i.e., sent to) the same application.

What is claimed is:

1. A method, said method comprising:

selecting, by a processor of a computer system in response to a first action by a user, a first file from within a file directory;

after the first file has been selected and in response to a first function being activated and also in response to a first queue being selected by a user from a first menu of multiple queues displayed to the user in response to the first function being activated, said processor sending the first file or particular parameters of the first file to the first queue, wherein the particular parameters of the first file are a unique identifier of the first file and an address/location/link for the first file, wherein particular parameters of any file are a unique identifier of the any file and an address/location/link for the any file, and wherein the first function is selected for activation from a list of available functions configured to be selectively applied to selected files within the file directory; and in response to a second function being activated while the first file or the particular parameters of the first file, are within the first queue and also in response to a first application being selected by the user from a second menu of multiple applications displayed to the user in response to the second function being activated, said processor automatically sending the first file to the first application, wherein the activated second function causes the first application to automatically import and open the first file.

2. The method of claim 1, said method further comprising:

said processor selecting, after said sending the first file or the particular parameters of the first file to the first queue and in response to a second action of the user, a second file from within the file directory;

after the second file has been selected and in response to the first function being activated again and also in response to a second queue being selected by the user from the first menu of multiple queues displayed to the user again in response to the first function being activated again, said processor sending the second file or the particular parameters of the second file to the second queue, wherein the first queue and the second queue are different queues; and in response to the second function being activated while the first file or the particular parameters of the first file is within the first queue and while the second file or the particular parameters of the second file are within the second queue and also in response to the selection of the first application by the user, said processor automatically sending the first file and the second file to the first application, wherein the activated second function causes the first application to automatically concurrently import and open the first file and the second file.

3. The method of claim 1, wherein the particular parameters of the first file, and not the first file, are sent to the first queue, and wherein the particular parameters of the second file, and not the second file, are sent to the second queue.

4. The method of claim 1, said method further comprising:
said processor enabling user manipulation when a third function from among the list of available functions is activated, said user manipulation including sorting files, having particular parameters within and not being within, the first queue and deleting files, having particular parameters within and not being within, the first queue.

5. The method of claim 4, said method further comprising:
when a request is received to sort the files having particular parameters within and not being within the first queue following activation of the third function, said processor automatically providing a selection of sorting methods which identify one or more sorting options for sorting the files having particular parameters within and not being within the first queue.

6. The method of claim 1,
wherein the first function and second function are enhancements to an operating system (OS) of the data processing system and are installed within code of the OS, post manufacture of the OS, and
wherein the method comprises displaying the first function and the second function as drop down menu options when a file directory is opened, at least one of a file and a folder containing one or more files is selected, and a list of options to apply to a selected file is requested.

7. The method of claim 1,
wherein said selecting the second file comprises: opening a second folder within the file directory having a folder address location that is different from a first location from which the first file is selected; and selecting the second file while the particular parameters of first file, and not the first file, are in the first queue, and wherein (a) particular parameters of multiple files from multiple different folder locations within the file directory are added to the first queue and (b) multiple different files from multiple different folder locations are concurrently opened via a single activation of the second function while particular parameters of files are either queued within the first queue or the files are currently selected.

8. The method of claim 1, said method further comprising:
said processor highlighting an entire folder of files within the file directory; and
said processor applying the first function to the highlighted folder, wherein the first function individually queues particular parameters of each file within the folder and sub-folders of the highlighted folder into the first queue.

9. The method of claim 1, said method further comprising:
said processor highlighting an entire folder of files; and
said processor activating the second function while the entire folder is highlighted, wherein the second function individually imports each file within the highlighted folder and sub-folders of the folder into the application.

10. The method of claim 1, said method further comprising:
responsive to receipt of a request to create a next queue following selection of a third file, said processor creating a second queue within which particular parameters of the third file is stored;
said processor prompting for a selection of one of the first queue and the second queue when a fourth file is subsequently selected for queuing particular parameters of the fourth file;
said processor prompting for a next selection from among the first queue and the second queue when activation of the second function is detected, wherein only files having particular parameters from the selected one of the first queue and the second queue are sent to the application; and
said processor storing an unselected one of the first queue and the second queue for later forwarding associated files to an application that is selected when the second function is later activated.

11. A computer program product, comprising: a computer readable hardware storage device having computer readable program code stored therein, said program code, upon being executed by a processor of a computer system, implements a method, said method comprising:
said processor selecting, in response to a first action by a user, a first file from within a file directory;
after the first file has been selected and in response to a first function being activated and also in response to a first queue being selected by a user from a first menu of multiple queues displayed to the user in response to the first function being activated, said processor sending the first file or particular parameters of the first file to the first queue, wherein the particular parameters of the first file are a unique identifier of the first file and an address/location/link for the first file, wherein particular parameters of any file are a unique identifier of the any file and an address/location/link for the any file, and wherein the first function is selected for activation from a list of available functions configured to be selectively applied to selected files within the file directory; and
in response to a second function being activated while the first file or the particular parameters of the first file, are within the first queue and also in response to a first application being selected by the user from a second menu of multiple applications displayed to the user in response to the second function being activated, said processor automatically sending the first file to the first application, wherein the activated second function causes the first application to automatically import and open the first file.

12. The computer program product of claim 11,
said processor selecting, after said sending the first file or the particular parameters of the first file to the first queue and in response to a second action of the user, a second file from within the file directory;

after the second file has been selected and in response to the first function being activated again and also in response to a second queue being selected by the user from the first menu of multiple queues displayed to the user again in response to the first function being activated again, said processor sending the second file or the particular parameters of the second file to the second queue, wherein the first queue and the second queue are different queues; and in response to the second function being activated while the first file or the particular parameters of the first file is within the first queue and while the second file or the particular parameters of the second file are within the second queue and also in response to the selection of the first application by the user, said processor automatically sending the first file and the second file to the first application, wherein the activated second function causes the first application to automatically concurrently import and open the first file and the second file.

13. The computer program product of claim 11, wherein the particular parameters of the first file, and not the first file, are sent to the first queue, and wherein the particular parameters of the second file, and not the second file, are sent to the second queue.

14. The computer program product of claim 11, said method further comprising:

said processor enabling user manipulation when a third function from among the list of available functions is activated, said user manipulation including sorting files, having particular parameters within and not being within, the first queue and deleting files, having particular parameters within and not being within, the first queue.

15. The computer program product of claim 14, said method further comprising:

when a request is received to sort the files having particular parameters within and not being within the first queue following activation of the third function, said processor automatically providing a selection of sorting methods which identify one or more sorting options for sorting the files having particular parameters within and not being within the first queue.

16. A computer system, comprising: a processor and a memory coupled to the processor, said memory containing program code, which, upon being executed by the processor, implements a method, said method comprising:

said processor selecting, in response to a first action by a user, a first file from within a file directory;

after the first file has been selected and in response to a first function being activated and also in response to a first queue being selected by a user from a first menu of multiple queues displayed to the user in response to the first function being activated, said processor sending the first file or particular parameters of the first file to the first queue, wherein the particular parameters of the first file are a unique identifier of the first file and an address/location/link for the first file, wherein particular parameters of any file are a unique identifier of the any file and an address/location/link for the any file, and wherein the first function is selected for activation from a list of available functions configured to be selectively applied to selected files within the file directory; and in response to a second function being activated while the first file or the particular parameters of the first file, are within the first queue and also in response to a first application being selected by the user from a second menu of multiple applications displayed to the user in response to the second function being activated, said processor automatically sending the first file to the first application, wherein the activated second function causes the first application to automatically import and open the first file.

17. The computer system of claim 16, said processor selecting, after said sending the first file or the particular parameters of the first file to the first queue and in response to a second action of the user, a second file from within the file directory;

after the second file has been selected and in response to the first function being activated again and also in response to a second queue being selected by the user from the first menu of multiple queues displayed to the user again in response to the first function being activated again, said processor sending the second file or the particular parameters of the second file to the second queue, wherein the first queue and the second queue are different queues; and in response to the second function being activated while the first file or the particular parameters of the first file is within the first queue and while the second file or the particular parameters of the second file are within the second queue and also in response to the selection of the first application by the user, said processor automatically sending the first file and the second file to the first application, wherein the activated second function causes the first application to automatically concurrently import and open the first file and the second file.

18. The computer system of claim 16, wherein the particular parameters of the first file, and not the first file, are sent to the first queue, and wherein the particular parameters of the second file, and not the second file, are sent to the second queue.

19. The computer system of claim 16, said method further comprising:

said processor enabling user manipulation when a third function from among the list of available functions is activated, said user manipulation including sorting files, having particular parameters within and not being within, the first queue and deleting files, having particular parameters within and not being within, the first queue.

20. The computer system of claim 19, said method further comprising:

when a request is received to sort the files having particular parameters within and not being within the first queue following activation of the third function, said processor automatically providing a selection of sorting methods which identify one or more sorting options for sorting the files having particular parameters within and not being within the first queue.

* * * * *